March 13, 1962 S. R. BOSUSTOW 3,025,344

ANIMATED PICTURE VIDEOTAPE RECORDING

Filed Aug. 25, 1958

INVENTOR.

STEPHEN R. BOSUSTOW

BY D. Gordon Angus

ATTORNEY.

3,025,344

ANIMATED PICTURE VIDEOTAPE RECORDING

Stephen R. Bosustow, 16154 High Valley Place, Encino, Calif.

Filed Aug. 25, 1958, Ser. No. 757,051
6 Claims. (Cl. 178—6.6)

This invention relates to the tape recording of images, and in particular to a method for adapting videotape recording to the production of animated pictures.

The technique of recording live action on magnetic tape (videotape recording) is now well known, and several devices for this purpose are on the market. The usual technique for such magnetic recording is for a videotape recorder to scan the image and to produce an electrical pulse in response to the scanning action, which pulse magnetizes a localized area on the tape. The tape may be played back at a later time so that the stored intelligence is converted into impulses which are displayed on a cathode ray tube.

The above technique is quite suitable for live action, and produces a high quality picture. However, this technique has not as yet been able to produce high quality pictures from motion pictures. This is for the reason that the only available means at the present time for obtaining pulses for storage on the tape consists of projecting the motion picture onto an opaque screen and scanning the screen as the movie is projected thereon. This has resulted in relatively poor pictures when the tape is played back for the reason that the technique incorporates not only the disadvantages inherent in the tape reproduction, but also all of the disadvantages inherent in motion picture projection, such as film weave, grain effects, and the like. It is to be expected that a magnetic picture derived from a projected motion picture would not be as good as an image produced directly from live action for the reason that the tape was derived from a two-step process. The situation is even worse in attempting to obtain videotape reproduction for animated cartoons, inasmuch as the animation in these cartoons is somewhat jerky at best, and it does them no good to be passed through two processes in attempting to secure their images on a tape record.

It is evident that particularly in the production of a film representing discontinuous motions, such as animated cartoons, it would be desirable for the art work to be transcribed directly onto the magnetic film, rather than from an image projected on a screen. However, such a technique has not heretofore been practicable inasmuch as the magnetic film is ordinarily operated at a speed of the order of fifteen feet per second, and of course it is known that in preparing each frame of an animated cartoon it is necessary to completely change the art work so as to make successive images with small increments of motion between them, and therefore a change of images at the speed of the projection of frames has not been possible. Absent this, no means has been provided to make it possible to record individual successive images on a tape so that the resulting tape could be played at the proper speed. It is the object of this invention to provide a method for such a purpose and means for performing this operation.

This invention is carried out by setting up the art work of a first image and providing a videotape recorder that includes a scanner, which "sees" the image and produces timed electrical impulses to represent what it "sees." These impulses are provided to a recording head, which recording head has for its purpose the transmission of these images to the magnetic tape for storage thereon. After the art work is set up to be scanned by the scanner, then according to this method, the film and the recording head are moved relative to each other so as to produce spaced impulses on the film which are spaced by an amount proportional to the speed of the tape through a play-back mechanism. After the image has been scanned and recorded for the equivalent of one frame, the relative motion is stopped and a second, and successive images, which are discontinuous but spaced in time replace the first image, one by one and the process is indefinitely repeated until the desired sequence is recorded.

The invention will be fully understood from the following detailed description and the accompanying drawings in which.

Figure 1:
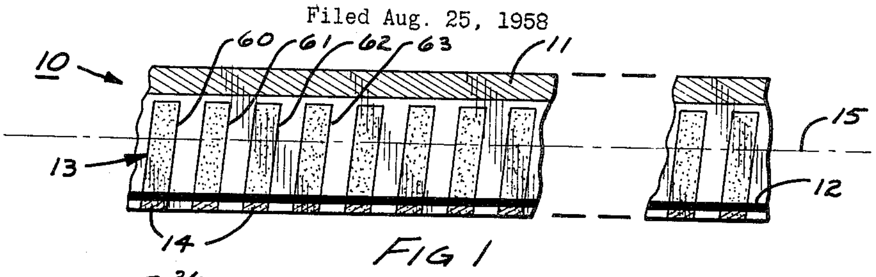
FIG. 1 is a plan view of a portion of a strip of magnetic tape which can be utilized in the process of this invention.

A tape 10 suitable for use with this invention is shown in FIG. 1, only a short segment of the tape being shown. It will be understood that the tape is of indefinite length, as much tape being provided as is necessary for the registration of as many images as are desired. The particular tape shown is produced by Ampex Corporation, 934 Charter Street, Redwood City, California. This tape is approximately two inches wide and has an audio track 11 at one edge, a cue track 12 near its other edge, and a plurality of video-recording stripes 13. The portions of the video stripes between the lower edge of the tape in FIG. 1 and the cue stripe 12 will be referred to as index stripes 14.

The video stripes 13 are disposed at a slant to the longitudinal axis 15 of the tape (the direction of movement). An early problem with recording video images on tape was the fact that when the impulses were spaced longitudinally along the tape in a straight line, the speed of the tape had to be much too high, and the tape itself had to be much too long. This difficulty was overcome by providing a rotating head which tended to apply the signal impulses to the tape in a slant. The path of the laid-down impulses in space between a stationary rotating recording head and the moving tape was approximately helical.

In the tape embodiment shown when used in connection with the well known Ampex Corporation videotape recorder, VR–1000, the tape speed is approximately thirty inches per minute. Each of the video stripes 13 is approximately one-fourth inch in axial length. In the recording of ordinary television programs, it is common practice to use alternate stripes to pick up inter-leaved scanned portion of the scene being taken. In this invention it is preferred to utilize four stripes for recording each image, inasmuch as the tape, when it progresses at the rate of fifteen inches per second will thereby show fifteen different images per second (each being repeated twice), which is the rate at which animated cartoons are generally shown.

Figures 2, 3:
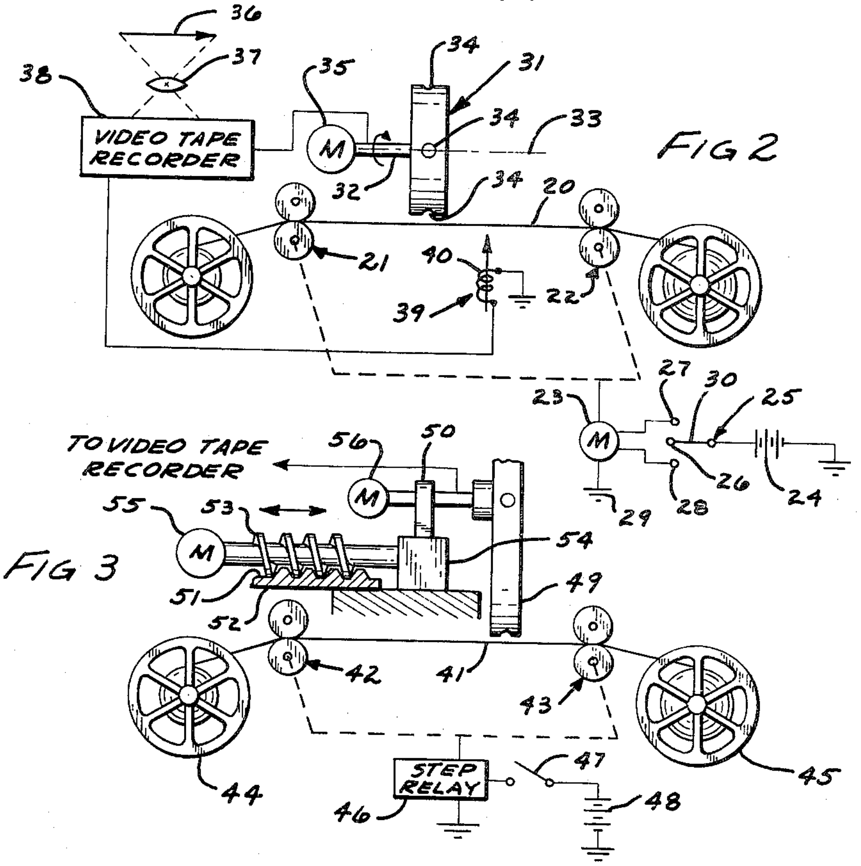
FIG. 2 is a side elevation, partly in schematic notation, showing a device in which the invention may be carried out.
FIG. 3 is an elevation partly in schematic notation showing an alternate embodiment of equipment in which the invention may be carried out.

A device suitable for use in connection with the method of this invention is shown in FIG. 2. An elongated tape 20 which has the same properties as tape 10 in FIG. 1 is wound between reels. The tape is moved by a conventional transport mechanism which includes two sets of opposed rollers 21, 22. The reels are operated to feed the transport mechanism, and take up the slack produced by it. A reversible motor 23 operates the transport mechanism, the driving connection between the motor and the transport mechanism being shown by a ganging symbol. The reversible control of the motor is secured from a voltage source 24 (which may be grounded as shown) that is connected to a three-position selector switch 25.

A central contact 26 represents a neutral condition of no motor operation, while operative contacts 27, 28 are respectively connected to windings (not shown) in the reversible motor 23. The windings are connected to a common ground 29. It will be seen that the contactor 30 of the three-position switch is capable of disconnecting the motor entirely, or of causing the motor to operate in either direction.

It is the purpose of motor 23 to move the tape 20 longitudinally back and forth beneath a recording head 31. This recording head comprises a circular cylindrical rotating structure which rotates on a shaft 32 around an axis of rotation 33 that is parallel to the direction of tape movement. In order to effectively carry out the recording of impulses onto this magnetic tape, it has been found necessary to provide the recording head with four emitting points 34, each of which emits the recording pulses. Most of the time, only one of the points transfers a pulse to the tape at any given time. As it happens, there is ordinarily an overlap of recorded signals at the two edges of the tape, but this is not of importance to the present invention. Three of the emitting points 34 are shown in FIG. 2. These points are spaced 90° apart, and it will be understood that there is a similar one directly behind the center point shown in FIG. 2.

Motor 35 is shown turning the shaft 32 around its axis of rotation. This motor is synchronized with other equipment, but inasmuch as the other equipment is no part of this invention, and it is not necessary to understand it to comprehend this invention, the other equipment and associated circuits are not discussed here.

An image 36 which schematically represents a first image of an arrangement representing a field of vision at a first instant of time is shown in FIG. 2. The rays emitted by this image are converged by a field lens 37 and cast upon a scanner which forms part of a videotape recorder 38. A device of this type is well known as the Ampex VR–1000 model which is essentially a scanner which produces a signal for recording on a magnetic tape, rather than for direct transmission to television sets. Inasmuch as this particular device forms no part of the invention, and in fact is fairly conventional, no detailed description of it is given here. It will be understood that this signal source produces its impulses to the recording head where the signal is emitted from the four emitting locations 34.

An indexing means 39 is also shown in FIG. 2. This indexing means comprises a pickup 40 which runs adjacent to the indexing portion 14 of the tape. This pickup is connected through a circuit to the videotape recorder and serves as a command to determine when a signal is to be provided to the recording head for transfer to the tape.

The device shown in FIG. 2 is intended to secure its recorded signal by moving the elongated tape 20 longitudinally relative to the head while the head rotates but does not move axially. Whether the tapes moves or the head moves, or whether both move, is not the operative feature of the invention, but rather it is only essential for the head and the tape to move relative to each other so that the signals to be recorded are spaced longitudinally along the tape. Therefore, another means for accomplishing the same result is shown in FIG. 3 in which, during the recording process, the tape is held still while the recording head is both rotated and moved axially.

With reference to FIG. 3, a tape 41 is shown wound between two reels, the tape being the same as tape 10 of FIG. 1. The tape is moved in discrete increments by a tape transport mechanism which includes two sets of opposed rollers 42, 43. Reels 44, 45 give and take up the tape moved by the transport mechanism. The transport mechanism is operated by a step relay 46 which is shown connected to the mechanism by a ganging symbol. A switch 47 is connected to a voltage source 48 and to relay 46 for actuating the relay.

A recording head 49 is shown rotatably mounted by a bearing 50 and connected to a videotape recorder that includes a scanner, which serves as a signal source to the recording head. In addition a rack 51 is mounted to a base 52, the base being stationary relative to the supports for the reels. To the rack there is mounted a lead screw 53 which is adapted to move a carriage 54 to which the bearing 50 is mounted. A motor 55 is connected to the lead screw to turn the same in order to move the carriage 54 along the base. A second motor 56, which may be mounted to the bearing if desired, is provided for turning the recording head.

The method according to this invention will first be described in connection with the embodiment shown in FIG. 2. A first image 36 is placed in position before the scanner as shown. This first image may comprise the first frame of an animation sequence, this first frame being an arrangement of objects in a field, illustrating conditions in the field at a first instant. At that time the contactor of switch 25 is moved to contact 27 so that the tape begins to move beneath the recording head. In most videotape recorders, it is found that it takes the tape approximately 1.5 seconds to get up to speed. Of course, it is undesirable to record at any speed other than the proper running speed. Therefore, when images are to be recorded, the tape will be permitted to run until it is up to speed. This means that the tape must run without recording for about twenty-two inches. At that time the scanner is caused to scan the image and to supply its signal to the rotating recording head which transfers the signal to the tape 20.

The device is set so as to secure the first image twice, on stripes 60–63. One-half of the image is recorded on stripes 60 and 61, and the other half on stripes 62 and 63, adjacent stripes providing inter-leaved portions of the image. With the device set to scan only this one image and to record it on four stripes the recorder head can be adjusted so as to transfer no further impulses to the film after four stripes have been magnetized. The contactor of the three-position switch 25 is thereafter moved to make contact with terminal 28, and the tape is backed up well past the stripes which bear the recording of the first image.

A second image is then substituted for the first image 36. The first and second images are discontinuous, being separated (when making animated cartoons) in movement sequence by an animation increment of approximately one-fifteenth of a second. It will be understood that the increment inherent in the change of scene between the first and second images as projected is entirely independent of the period of time which elapses between recording them on the tape. This is to say that these images are discontinuous, but that when properly sequenced and placed adjacent to each other on the tape, then the straight-through playback of the tape will produce an animated cartoon.

After the art work for the second image is arranged, the motor 23 is started by connecting the contactor 30 to terminal 27. This causes the tape to run to the left in FIG. 2. In order that the recorder may not record the second image on the same stripes as it recorded the first image or skip a stripe, the indexing means 39 are provided. This indexing means is a pickup which detects the indexing stripes 14. The indexing stripes are at least partially magnetized whenever the recorder has recorded an image on that stripe. The pickup will detect the stripes which already have an image, and when it finally comes to a stripe which does not have an image, will provide a signal which is a command to the videotape recorder to again provide a signal to the recording head.

As can be seen from the edge view in FIG. 2, the indexing means is placed far enough ahead of the recording head that the recording head will be prepared to provide the signal to the tape when the anticipated, unrecorded stripe arrives at the recording head. Then when the four frames are completed for the image, the operator again stops and reverses the tape and goes through the same process for successive images. Conactor 30 rests on contact 26 between operations.

It will be seen that it is not important whether the operator runs the tape a few stripes too far when recording, or reverses a few stripes too many, because the time wasted by running a few inches of extra tape through the device for each image is small in comparison with the total operation time of the system, particularly the assembly of the art work for each image. The only matter of importance is that the tape must be reversed by a sufficient distance so that it can be up to speed by the time the index means commands the videotape recorder to provide recording impulses to the recorder head.

In FIG. 3 the operation is basically the same as that shown in FIG. 2, except that instead of moving the tape relative to a stationary recording head, the tape is stepped in incremental distances and held still during the recording process, while the recording head is moved relative to the tape. This does away with the requirement for indexing, because the tape and recording head will always be properly positioned. For example, before the first image is recorded on the tape, the recording head is properly positioned relative to four stripes. The videotape recorder provides impulses to the recording head, and motor 55 runs the head along the tape by the proper distance. Then motor 55 is reversed to return the carriage and head to the starting position, while stepping relay 46 advances the tape by four stripes. After this, the art work is changed, and second and successive images are recorded in the same manner.

The embodiment of FIG. 3 has certain advantages over that of FIG. 2, because the rotational rate of the head and its speed of axial movement can be adjusted quite simply without making any changes in other basic equipment to which this device is attached. Furthermore, scan speed and relative head-tape speed and recording head rotational rates can all be easily scaled down, if desired, so that a proportional signal is obtained which will produce a proper picture at regular speeds, although recorded at lesser speeds.

Regardless of whether the tape or the head or both do the actual moving, the tape obtained comprises a continuous magnetic tape recording of discontinuous images which are sequentially arranged in time, and this tape is obtained directly, eliminating the interim photographic step. This is a considerable advantage. The cartoon industry has encountered many problems in providing prints at a sufficiently early time to be of real usefulness. Very often there has been a delay of several days between the photographing of sequential images and the development of the print, and then after all the art work has been put away and customers are waiting for the print, it has been found that he print itself is not suitable. With this device, it is possible to learn at once, or at least within a very few minues, whether or not the quality of the print is commercially suitable. If it is not, the art work is still in hand, the machinery is still tooled up, and the work may be repeated. Furthermore, the print may be rushed out to customers within a few minutes after the actual recording on the magnetic film and copies may be directly secured which are of equal quality with the original.

This device is also useful in micro-filming where the images are not only discontinuous but non-sequential. No means have previously been provided whereby these individual images might be transcribed only upon short segments of magnetic tape to be available as transcribed images from the tape. Of course in this case, no illusion of animation is either desired or obtained.

This invention is not to be limited by the embodiments shown in the drawings and described in the description, which are given by way of example and not of limitation, but only in accordance with the scope of the appended claims.

I claim:

1. A method for recording a series of discontinuous images in spaced relationship along a continuous magnetic tape so as to produce a signal-bearing tape adapted to be played continuously and thereby provide a sequential display of said images and produce the illusion of animation, comprising: providing a first image showing an arrangement at a first instant in time; scanning said first image with a scanner to produce a recordable signal at a recording head; relatively moving said tape and recording head along the axis of length of the tape during the scanning operation at a rate of movement proportional to the rate of tape movement during playback and recording the signal on the tape until the image is scanned and recorded on a first portion of the tape; stopping said relative movement; and then providing second and successive images representing the appearance of said arrangement at later, discrete and discontinuous second and successive instants in time, and re-establishing said relative movement and repeating the scanning and recording processes on second and successive portions of the tape spaced from said first portion for each of said second and successive images so as to produce a sequence of adjacent magnetically reproducible representations of said images on said tape, whereby upon playback of the tape, the images are visually reproducible at evenly spaced intervals of time to produce an animated sequence of visible images.

2. A method according to claim 1 in which the tape is moved relative to the recording head, the recording head being restrained against movement in the direction of tape movement, to record the images, the tape being brought up to recording speed before recording each image, and stopped and reversed after each image is recorded by a distance such that the tape will be up to speed when the next image is recorded.

3. A method according to claim 1 in which the recording head is moved relative to the tape during recording of an image, the tape being held stationary at that time, the tape being stepped between each recording by the distance needed to record an image.

4. A method for recording a series of discontinuous images in spaced relationship along a continuous magnetic tape so as to produce a signal-bearing tape comprising: providing a first image showing a first arrangement; scanning said first image with a scanner to produce a recordable signal at a recording head; relatively moving said tape and recording head along the axis of length of the tape during the scanning operation at a rate of movement proportional to the rate of tape movement during playback and recording the signal on the tape until the image is scanned and recorded on a first portion of the tape; stopping said relative movement; and then providing second and successive images, discontinuous from the first and other images, and re-establishing said relative movement and repeating the scanning and recording processes on second and successive portions of the tape spaced from the first portion for each of said images so as to produce a sequence of adjacent magnetically reproducible representations of said images on said tape.

5. A method according to claim 4 in which the tape is moved relative to the recording head, the recording head being restrained against movement in the direction of tape movement, to record the images, the tape being brought up to recording speed before recording each image, and stopped and reversed after each image is recorded by a distance such that the tape will be up to speed when the next image is recorded.

6. A method according to claim 4 in which the recording head is moved relative to the tape during recording of an image, the tape being held stationary at that time, the tape being stepped beween each recording by the distance needed to record an image.

References Cited in the file of this patent

UNITED STATES PATENTS

| | | |
|---|---|---|
| 2,245,286 | Marzocchi | June 10, 1941 |
| 2,647,168 | Rivas | July 28, 1953 |

| | | |
|---|---|---|
| 2,648,589 | Hickman | Aug. 11, 1953 |
| 2,866,012 | Ginsberg | Dec. 23, 1958 |
| 2,897,259 | Dixon et al. | July 28, 1959 |
| 2,963,542 | Blackstone | Dec. 6, 1960 |

OTHER REFERENCES

RCA Tn. No. 20, Aug. 9, 1957.